(No Model.)
G. H. REYNOLDS.
VALVE FOR AIR AND GAS ENGINES.
No. 278,270. Patented May 22, 1883.
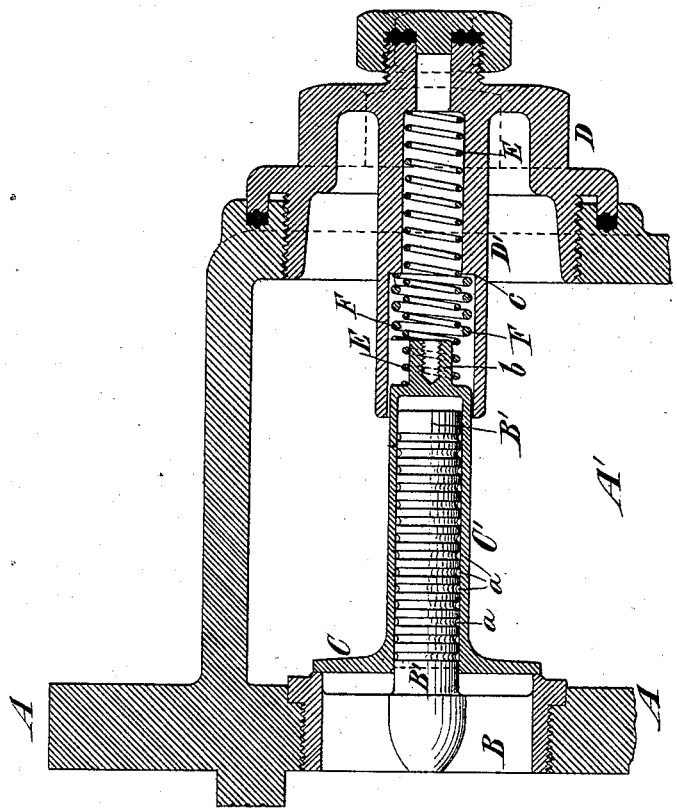
Witnesses:
Inventor:

UNITED STATES PATENT OFFICE.

GEORGE H. REYNOLDS, OF NEW YORK, N. Y., ASSIGNOR OF ONE-HALF TO CORNELIUS H. DELAMATER, GEORGE H. ROBINSON, AND WILLIAM DELAMATER, OF SAME PLACE.

VALVE FOR AIR AND GAS ENGINES.

SPECIFICATION forming part of Letters Patent No. 278,270, dated May 22, 1883.

Application filed December 27, 1882. (No model.)

*To all whom it may concern:*

Be it known that I, GEORGE H. REYNOLDS, of the city and county of New York, in the State of New York, have invented a new and useful Improvement in Valves for Air and Gas Engines, Compressors, and Pumps, of which the following is a specification.

In working air and gas engines, compressors, and pumps, it is found that a sticky, gummy, or dry residuum remains about the valves, and frequently accumulates about the valve-stems and their guides to such an extent as to impede the proper action of the valves.

The invention consists in the combination, with a valve having a tubular stem, of a guide or guide-rod fitting within said stem, and provided with one or more circumferential grooves in its portion on which the stem works. The aforesaid groove or grooves form sharp edges, which serve to scrape or cut the residuum from the internal surface of the tubular valve-stem, and tend to prevent its entrance between the stem and its guide, and the grooves form spaces in which the residuum may accumulate, so that it will not impede the action of the valve.

The invention also consists in a novel combination of parts hereinafter described.

The accompanying drawing represents a sectional view of a portion of the head for the cylinder of an air or gas compressor and a discharge-valve therefor embodying my invention.

Although I have only shown the invention as embodied in a discharge or outlet valve, it is equally applicable to suction or inlet valves.

A designates the head proper, which is to be bolted to the cylinder, and A' designates a discharge chest or chamber which is formed in the head, and from which the compressed air or gas may be conducted.

B designates the valve-seat, which is or may be screwed into the head, and which has a guide or guide-rod, B', projecting from it.

C designates the valve, and C' a hollow valve-stem, which surrounds and is adapted to work longitudinally on the guide B'.

So far as described I do not claim the construction of the valve-stem and its internal guide or guide-rod.

The guide B' is provided with directly circumferential grooves over the whole length of the surface on which the stem bears; but any number of directly circumferential grooves, or a single spiral groove, like a screw-thread, could be used with good effect.

The grooves *a* form spaces in which the residuum may accumulate without preventing the proper action of the valve, and the edges of the grooves tend to cut or scrape the residuum from the interior of the stem.

In the outer wall of the chamber A' is an opening through which the valve and its seat may be inserted and removed, and which is closed by a cap or bonnet, D. Projecting from the inner side of the cap or bonnet is a socket, D', which receives the end portion of the stem C' within it, and which contains a spring, E. The end portion of the spring surrounds a hub or projection, *b*, on the end of the valve-stem C', and the spring effects the closing of the valve.

The socket D' has an internal shoulder, *c*, against which rests a spiral spring, F. When the valve C opens, the end of the stem C' strikes against the spring F, and the latter therefore forms a yielding stop to limit the opening of the valve.

I do not here claim, broadly, the use of a metallic spring forming a yielding stop for limiting the opening movement of the valve; nor do I claim, broadly, a valve, valve-stem, or guide provided with grooves for the purpose herein described.

What I claim as my invention, and desire to secure by Letters Patent, is—

1. The combination, with a valve having a tubular stem, of a guide or guide-rod fitting within said stem, and provided with one or more circumferential grooves in its portion on which said stem works, substantially as and for the purpose described.

2. The combination, with the valve-stem C', of the socket D', provided with the shoulder *c*, the closing-spring E, and the stop-spring F, bearing against said shoulder, substantially as described.

GEO. H. REYNOLDS.

Witnesses:
CHANDLER HALL,
FREDK. HAYNES.